Figure 1:
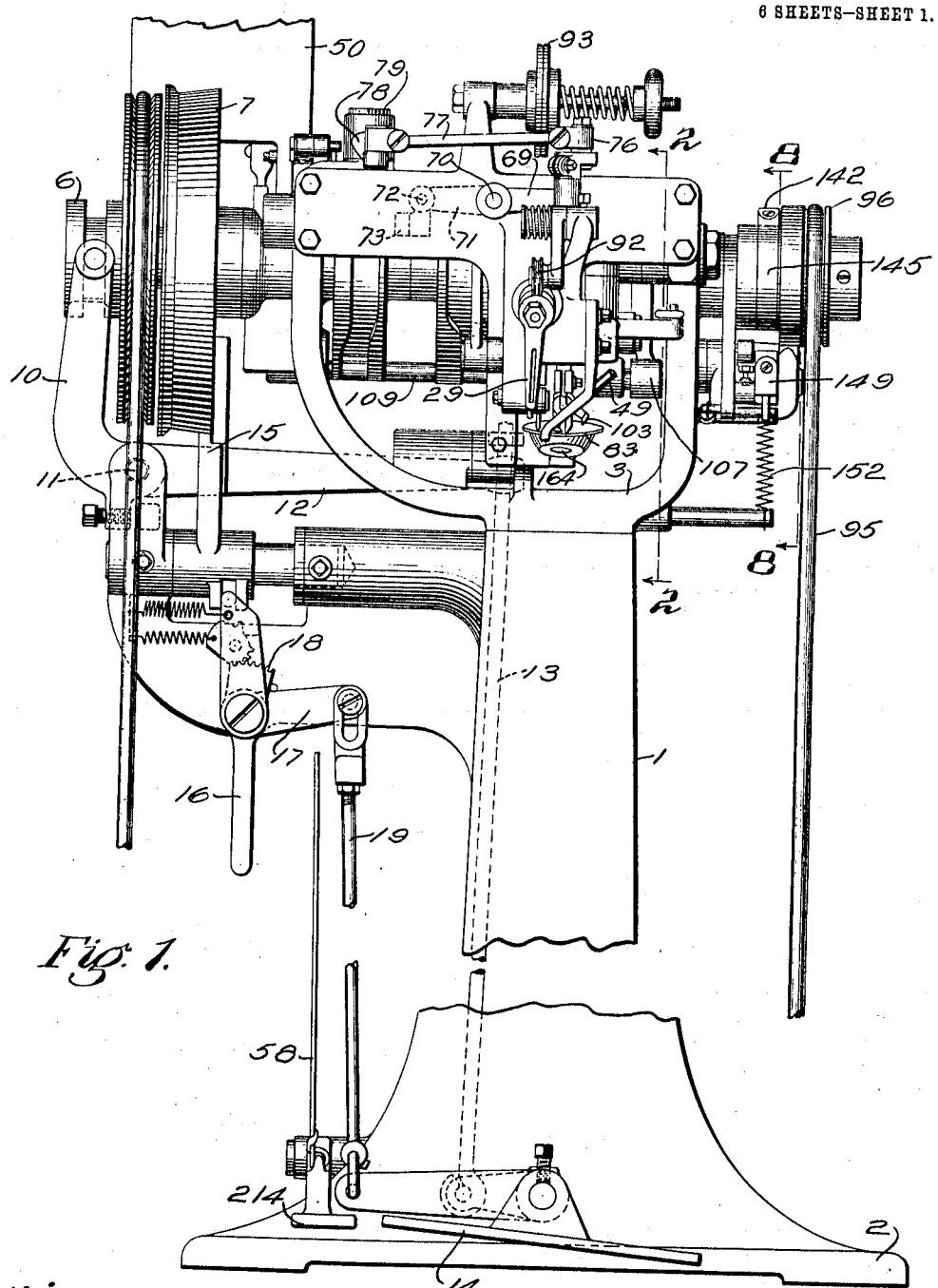

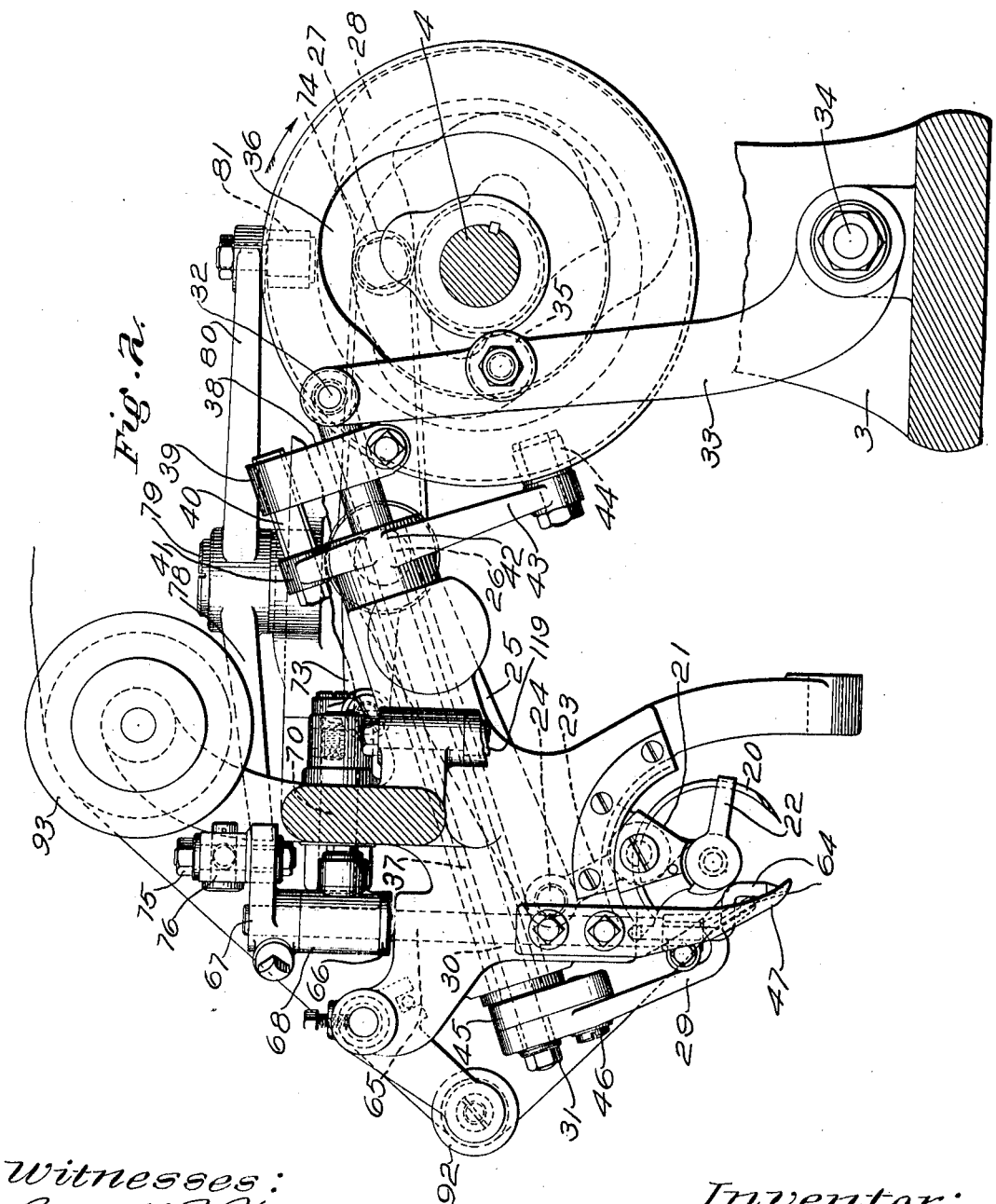

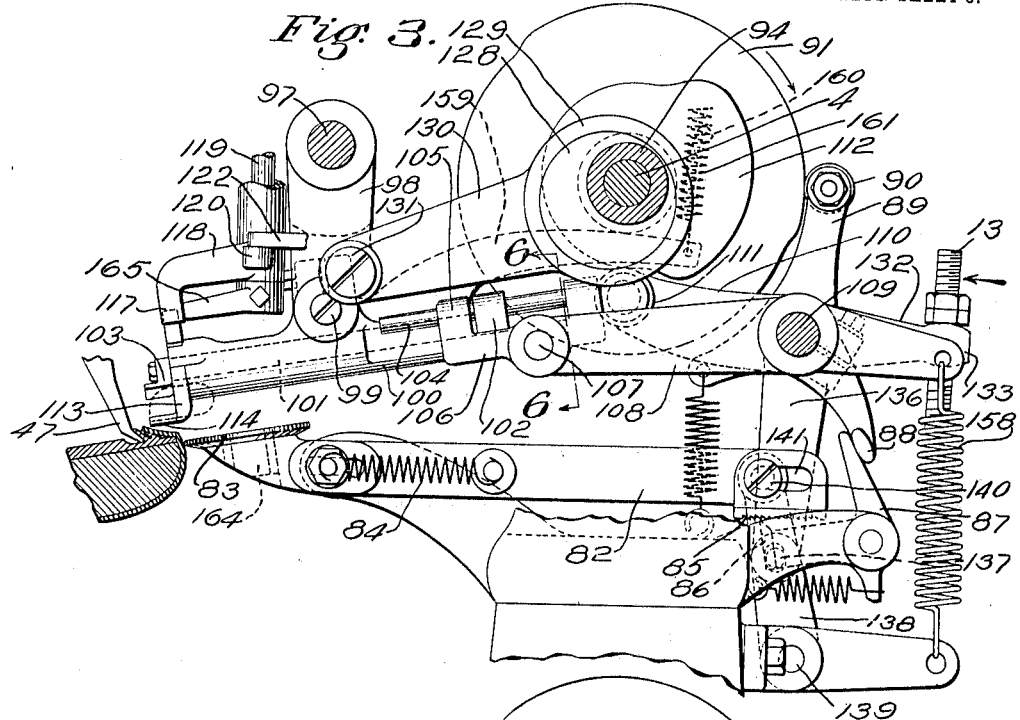

T. G. PLANT.
WELT SHOE PREPARING MACHINE.
APPLICATION FILED JULY 19, 1909.
1,048,871.
Patented Dec. 31, 1912.
6 SHEETS—SHEET 4.
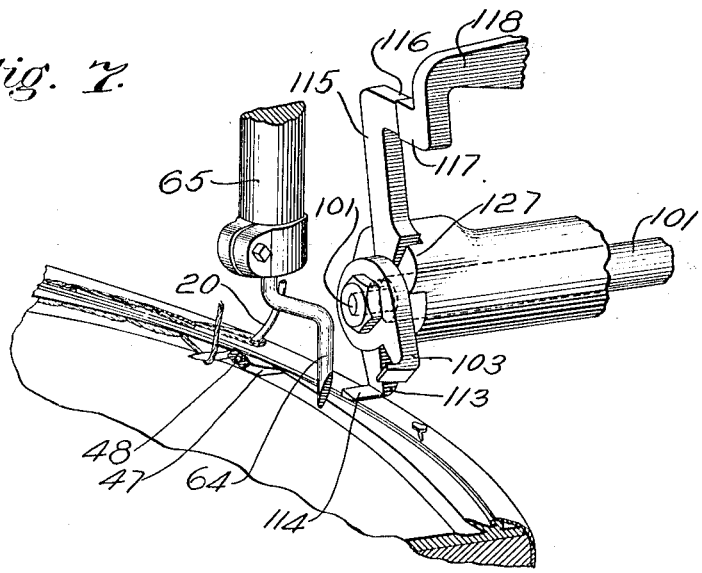
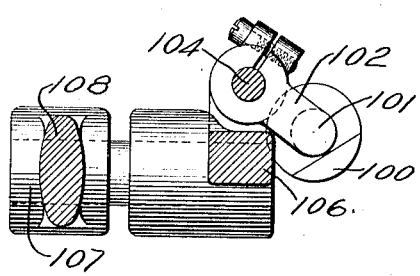
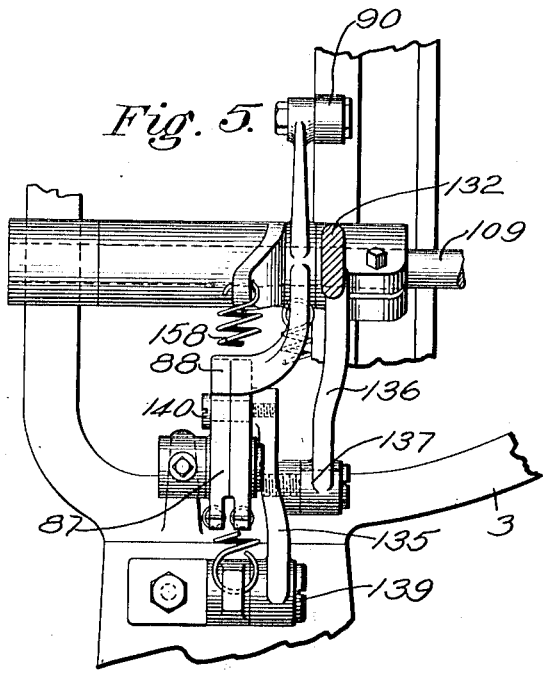
Witnesses:
Powell F. Hatch
Redfield H. Allen
Inventor
Thomas G. Plant
by Robt. P. Harris
Atty.

T. G. PLANT.
WELT SHOE PREPARING MACHINE.
APPLICATION FILED JULY 19, 1909.
1,048,871.
Patented Dec. 31, 1912.
6 SHEETS—SHEET 5.
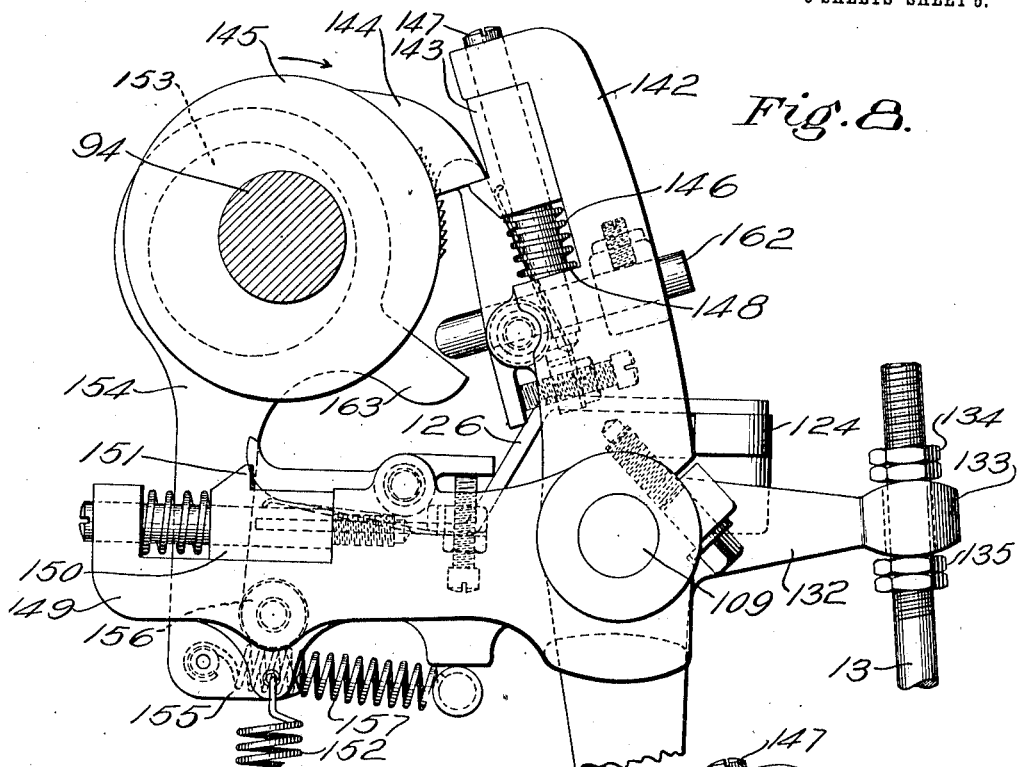
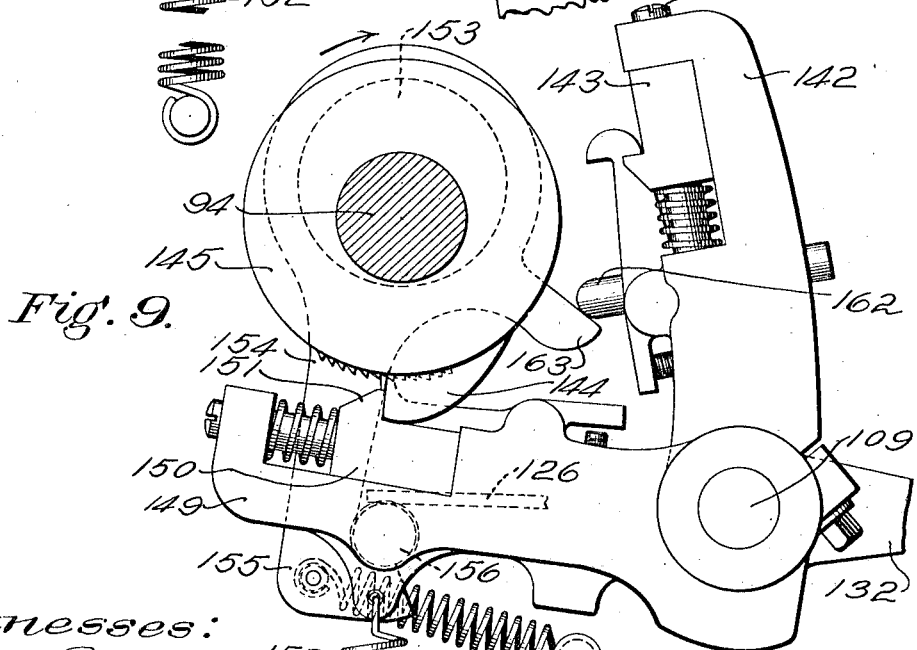
Witnesses:
Powell F. Hatch
Redfield H. Allen
Inventor
Thomas G. Plant
by Robt P. Harris
Atty.

T. G. PLANT.
WELT SHOE PREPARING MACHINE.
APPLICATION FILED JULY 19, 1909.
1,048,871.
Patented Dec. 31, 1912.
6 SHEETS—SHEET 6.
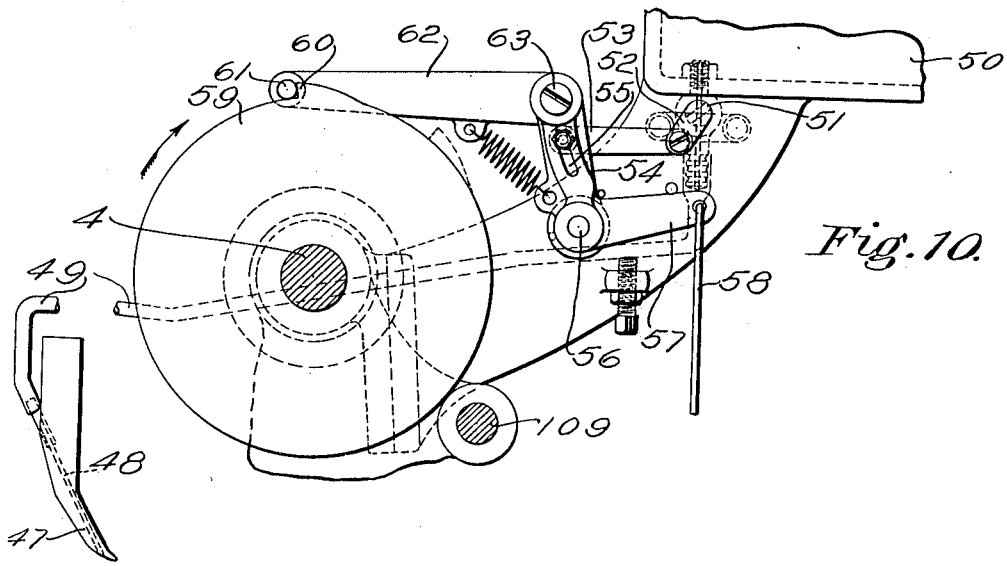
Fig. 10.
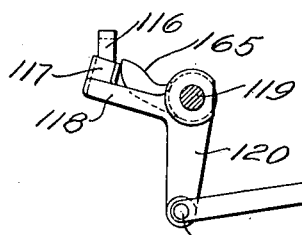
Fig. 11.
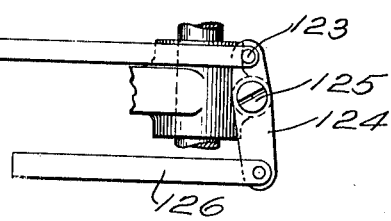
Fig. 12.
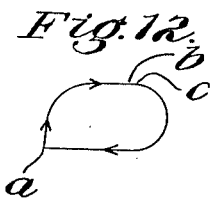
Witnesses:
Powell F. Hatch
Redfield H. Allen
Inventor:
Thomas G. Plant
by Robt. F. Harris,
Att'y.

UNITED STATES PATENT OFFICE.

THOMAS G. PLANT, OF BOSTON, MASSACHUSETTS, ASSIGNOR TO UNITED SHOE MACHINERY COMPANY, OF PATERSON, NEW JERSEY, A CORPORATION OF NEW JERSEY.

WELT-SHOE-PREPARING MACHINE.

1,048,871.  Specification of Letters Patent.  Patented Dec. 31, 1912.

Application filed July 19, 1909.  Serial No. 508,436.

*To all whom it may concern:*

Be it known that I, THOMAS G. PLANT, a citizen of the United States, residing at Boston, in the county of Suffolk and State of Massachusetts, have invented an Improvement in Welt-Shoe-Preparing Machines, of which the following description, in connection with the accompanying drawings, is a specification, like letters on the drawings representing like parts.

The invention to be hereinafter described relates to machines for treating boots and shoes, and more particularly to machines for preparing the shoe to receive the welt.

As well known by those skilled in the art, the shoe upper is usually secured to the insole and last by means of tacks partially driven into the last, and during the attachment of the welt to the upper and insole these tacks frequently cause trouble, as by contact with the needle and the like.

The aims and purposes of the present invention are to provide a machine which shall prepare the lasted shoe to receive the welt without the defects and objections arising from the presence of the lasting tacks, all of which will best be understood from the following description and accompanying drawings of one form or embodiment of means for carrying the invention into practical effect, it being understood that the invention is not restricted to such details as are shown and described, but is definitely set forth by the claims.

In the drawings:—Figure 1 is a front elevation of a machine embodying the features of the present invention, some of the parts being broken away; Fig. 2 is an enlarged sectional view taken substantially on the line 2—2, Fig. 1, and showing more particularly the stitch forming mechanism, other parts being purposely omitted; Fig. 3 is an enlarged section on the line 2—2 of Fig. 1, showing the tack pulling mechanism, the stitch forming mechanism being omitted; Fig. 4 is a view similar to Fig. 3 with the parts in a different position; Fig. 5 is a detached detail view looking in the direction of the arrow, Fig. 3; Fig. 6 is a section on the line 6—6 of Fig 3; Fig. 7 is a detail perspective view showing the sewing and tack pulling instrumentalities in their associated relation with the shoe; Fig. 8 is an enlarged section on the line 8—8 of Fig. 1, showing the clutching devices for controlling the tack pulling instrumentalities; Fig. 9 is a view similar to that of Fig. 8 with the parts in a different position; Fig. 10 is a detached detail view showing the means for supplying moisture to the channel of the shoe sole; Fig. 11 is a detached detail showing the means for initiating the jaw closing and tack pulling movement; and Fig. 12 is a diagrammatic view illustrating the general movement of the tack puller.

The present invention contemplates the association of the upper with the insole for the reception of the welt and the action of the welter without the presence of tacks or like fastening means holding the upper and insole in associated relation.

As one form of the present invention means are provided for securing the upper and insole by a series of stitches and withdrawing from the lasted shoe the lasting tacks, so that when the lasted shoe is presented to the welter, the well known objections to the presence of the lasting tacks will be avoided.

The machine frame may be of any usual or desired character and in the present form of the invention is disclosed as a suitable column 1 rising from a base 2 and having a head 3 of suitable character for supporting some of the operative parts of the machine, Fig. 1.

As a convenient arrangement for description the sewing instrumentalities may be first brought to attention. Mounted in suitable bearings in the head of the machine is a sewing shaft 4, Figs. 2, 3 and 4, which may be appropriately driven from any suitable source of power by means substantially as set forth in my application, Ser. No. 437,817, filed June 11, 1908, wherein a clutch member 7 is secured to said sewing shaft so as to rotate therewith, and has associated therewith a loose member, together constituting an appropriate form of clutch for connecting and disconnecting the sewing shaft and driving means. The hub 6 of the loose clutch member is engaged by the upper end of an operating lever 10 pivotally mounted on the main frame at 11 and having its arm 12 connected by a rod 13 to a suitable treadle 14, Fig. 1, the construction being such that upon depression of the treadle the clutch members on the sewing shaft may be brought into operative relation, all as set forth more fully in my prior application, to which reference may be had. Likewise, as set forth in my said application, there is provided a stop finger 15 adapted to be engaged by a suitable stop arm, as pointed out in my said application, whereby the operative parts of the machine may be brought to rest gradually and the main shaft reversed. Suitable means may also be provided, as, for instance, the hand lever 16, arm 17, intermeshing segments 18 and treadle rod 19, all as fully explained in my said prior application, for permitting hand manipulation of the machine without danger of being power driven.

Since the parts so far described form no essential of the present invention and are clearly and fully set forth in detail in my prior application referred to, further elucidation herein will be unnecessary.

Having reference more particularly to Fig. 2, the needle 20 of any usual type is suitably supported by the needle segment 21 and passes through a guide 22, said segment having connected thereto a link 23 pivoted at 24 to a lever 25 fulcrumed on the machine frame at 26 and having at its free end a roll 27 for engagement with the cam path 28 carried by a suitable cam disk secured to the main sewing shaft 4, so that upon rotation of the shaft the needle 20 will be given the characteristic movements for passing through and withdrawing from the work.

The looper arm 29, Fig. 2, may be of any usual or desired character and is appropriately secured to the end of a looper shaft 30 by means of a nut 31, said shaft extending rearwardly, as indicated in Fig. 2, and pivotally connected at 32 to the upper end of a looper lever 33 which is itself pivotally mounted at 34 to the machine frame. The looper lever 33 carries a roller 35 adapted to engage a cam-path 36 carried by a suitable cam element and secured to the sewing shaft 4. Surrounding the looper shaft 30 is a sleeve 37, Fig. 2, which extends rearwardly and has secured thereto a clamp 38, the end 39 of which engages a pin or stud 40 projecting from the arm 41 mounted to rock upon the sleeve 37, as at 42, said arm being extended, as at 43, and carrying a roll 44 which engages a suitable peripheral cam whereby the sleeve 37, and perforce the looper shaft, is given a rocking movement, said sleeve 37 and looper being connected by means of a head 45 carried by the sleeve and secured to the looper at 46. Obviously any appropriate means may be employed to give the described characteristic movements to the needle and looper.

Secured to the machine head is a fixed channel guide 47, Fig. 2, said channel guide having, as indicated in Figs. 7 and 10, an opening or passageway 48 for suitable tempering fluid supplied thereto through a connection 49 from a tank 50, Figs. 1 and 10. A valve 51 is interposed between the tank 50 and the channel guide and has connected thereto an arm 52 which is joined by a link 53 to an arm 54 pivoted at 56 and having a slot 55 for adjustment of the link 53. The arm 54 is connected to the arm 57 which is appropriately joined by a rod 58 to the treadle 214, the construction being such that, upon depression of the treadle, the valve 51 will be opened and liquid be permitted to flow into the channel of the shoe sole. As a means for closing the valve when the machine stops, the sewing shaft 4 has secured thereto, Fig. 10, a valve operator 59 provided with a shoulder 60 adapted to engage a pin 61 carried by an arm 62 pivoted at 63 to the arm 54, the construction being such that, upon movement of the valve operator 59 in the usual direction for the sewing operation, the pin 61 will ride idly over the surface thereof, but upon reverse rotation of the shaft the shoulder 60 will engage the pin 61 and close the valve, as will be readily understood.

The present invention contemplates connecting the upper to the insole by a series of stitches which, if desired, may be longer than usual, that is, in the nature of basting stitches. To this end the present invention contemplates feeding the work positively the desired distance between stitches by means of an instrumentality that will engage the work and after each stitch give it its proper feed movement. In the present form of the invention the feeding element comprises a spudger 64, that is, a sharp pointed instrument, carried at the lower end of a rock shaft 65 properly journaled in the machine head. The rock shaft 65 has secured thereto collars 66 and 67, Fig. 2, between which is a sleeve 68 connected to a lever 69 fulcrumed on the shaft or stud 70, said shaft having projecting rearwardly the arm 71 connected at 72 to a lever 73 fulcrumed at 26 on the machine frame and having its free end 74 provided with a roll for engagement with the suitable cam track carried by the cam element secured to the main sewing shaft 4, the construction being such that upon rotation of the shaft 4 appropriate rising and falling movement will be imparted to the feeding element or spudger.

Connected to the upper collar 67, Fig. 2, out of axial alinement therewith is the pin 75 which is embraced by a suitable collar 76 connected by a link 77 to the end of an actuating lever 78 pivoted at 79 to the machine frame and having its arm 80 provided with a roll 81 for engagement with a suitable cam element for imparting to said lever 78 appropriate rocking movement, the construction being such that upon operation of the sewing shaft 4 the spudger will be given the necessary rising and falling and oscillatory movements to feed the work.

In order that the spudger may appropriately feed the work a desired stitch length, the spudger is given a double feeding movement between each stitch formation, that is, it is raised and lowered and swung or oscillated axially twice after each stitch, the cams for actuating the spudger operating levers being appropriately formed for this purpose.

Mounted to slide back and forth on the machine head is the back gage carrier 82, Figs. 3 and 4, carrying at its end a back gage 83 which is adapted to bear against the work, as indicated in Fig. 3, when said gage is permitted to move forward. A spring 84, one end of which is secured to the machine frame and the other end to the gage carrier 82, normally acts to move the gage into forward or operative position. As a means for holding the gage in operative position it is provided with a series of ratchet teeth 85 adapted to be engaged by a lock 86 carried by one arm of a bell crank lever 87, Figs. 3 and 4, the other arm of said bell crank being engaged by a toe 88 carried by the lever 89, said lever 89 having a roll 90 bearing upon a cam 91, Figs. 3 and 4, secured to the main sewing shaft 4, the construction being such that upon rotation of the cam 91 the back gage will be suitably locked and unlocked for holding it in its operative position to allow proper action of the needle.

From the construction thus far described it will be apparent that upon depression of the treadle 14 the main sewing shaft will be set in operation and the sewing instrumentalities, hereinbefore described, will be given their characteristic action to cause the needle to pass through the work, as indicated in Fig. 7, and secure the upper and insole in their associated relations, it being understood that the sewing instrumentalities have associated with them a suitable take-up 92 and tension wheel 93; and as each stitch is formed that the spudger by its duplicate movement will serve to feed the work the desired length of the next stitch.

As hereinbefore pointed out, when the upper, insole and last are assembled, or in other words when the shoe is lasted, a series of tacks are driven through the upper and insole into the last to hold the parts in associated relation. These tacks usually project some little distance from the surface of the work and the present invention contemplates the withdrawal of these tacks in further preparing the lasted shoe for the welting operation.

Mounted in suitable bearings in the machine frame head and preferably in axial alinement with the main sewing shaft is a shaft 94, Figs. 3 and 4, which for identification may be known as the tack pulling or sleeve shaft.

The tack pulling or sleeve shaft 94 is appropriately driven by means of a belt 95, Fig. 1, from a suitable source of power, a suitable friction clutch being interposed between the pulley 96 upon which said belt runs and the tack pulling shaft 94. The preferred form of clutch connection between the driving pulley 96 and the shaft 94 is such that when one member of the clutch is held from rotative movement the clutch action or operative connection between the driving member and the shaft shall be interrupted, and when such member is free to act it will automatically connect the clutch members and driving shaft to cause operative relation between them. A usual and common form of such device, and one well understood in the art, is known as the "Horton" clutch, a form of which is described in patent to Stewart, No. 871,967, Nov. 26, 1909, and this, or so much thereof as is necessary to make clear the present invention, is indicated in the drawings, its details of structure being well understood, needing no further elucidation.

Before proceeding with the detailed description of the means for controlling the clutch for the tack pulling shaft for operating the tack pulling element, it may be well to refer to the characteristics of the tack puller itself.

Mounted to swing upon a fulcrum or pivotal support 97 is an arm 98 pivotally connected at 99 to a jaw carrier 100. Extending longitudinally through the jaw carrier is a shaft 101 having secured thereto the movable jaw 103, Figs. 3, 4 and 7. The opposite end of said jaw carrying shaft 101 is provided with an offset or crank arm 102 adapted to be secured to a slide rod 104 movable in suitable bearings 105 of a yoke 106, said yoke 106 being pivotally mounted at 107 on the arm 108 mounted to rock on the stud shaft 109. Secured to the hub of the arm 108 is a roll carrying arm 110 carrying a roll 111 adapted to bear upon the peripheral portion of a cam 112 secured to the tack pulling shaft, the construction being such that if the jaw carrier is held in fixed position and the cam 112 is caused to act upon the roll 111 the movable jaw will be swung with its shaft 101 into and out of operative relation with a coöperating fixed jaw to be presently described.

Loosely mounted upon the jaw carrying shaft 101 is the jaw 113, Fig. 7, which for identification may be known as the fixed jaw. Said jaw 113 has a foot portion 114 adapted to overlie the work, as indicated in Fig. 7, and to meet any tack that may be projecting from the upper. Rising from the fixed jaw 113 is an arm 115 having its end 116 normally in contact with the end 117 of a bell crank lever 118, Figs. 7 and 11, pivoted at 119, Fig. 11, and having its arm 120 connected at 121 to a link 122 pivoted at 123 to one arm of a lever 124 fulcrumed at 125 and having jointed to its opposite end the trip 126, Figs. 8, 9 and 11, the construction being such that should the fixed jaw 113 be met by a tack, as indicated in Fig. 7, as the shoe is fed by the spudger during the sewing operation, said jaw 113 will be moved on its fulcrum a distance defined by the stop 127, Fig. 7, thereby acting upon the arm 118 of the bell crank and moving the trip 126 for a purpose that will presently appear.

Secured to the tack pulling shaft 94, Figs. 3 and 4, is an eccentric 128 embraced by an eccentric strap 129 carried by an arm 130 which is pivotally connected at its end 131 to the jaw carrier 100, the construction being such that upon rotation of the tack pulling shaft, in a manner to be presently described, the eccentric and the cam 112 will operate by their combined action to give to the tack pulling jaws their characteristic tack pulling, tack releasing and returning movement to initial position, all as will presently appear.

Fixedly mounted on the shaft 109 is a bell crank lever one arm 132 of which has a bifurcated end 133 which embraces the upper end portion of the treadle rod 13, Figs. 3, 4 and 8, said bifurcated end being preferably disposed between adjusting nuts 134 and 135 appropriately screw-threaded to the end of the said treadle rod. The downwardly extending arm 136 of said bell crank is connected at 137, Figs. 3 and 4, to an arm 138 pivoted at 139, said arm 138 having a pin 140 which is engaged in the slot 141 of the back gage 83, the construction being such that upon depression of the treadle the bell crank lever will be turned and move the pin 140 to the left, Figs. 3 and 4, thereby permitting the back gage 83 to move to operative position.

Secured to and projecting upward from the shaft 109 is the stop arm 142, Figs. 8 and 9, having a block 143 provided with a shoulder to engage the stop lug 144 on the member 145 of the "Horton" clutch. The block 143 is preferably supported by the stop arm 142 yieldingly, as by means of a spring 146 surrounding the stud 147 which passes through the block 143, said spring bearing at its lower end upon an appropriate shoulder 148 of the stop arm. From the construction thus far described it will be apparent that upon depression of the treadle rod 13 the stop arm 142 will be withdrawn from the stop lug 144 on the clutch member 145, thus freeing said clutch member and permitting the clutch members to become operatively engaged with the shaft 94, as usual in the "Horton" clutch construction, as will be well understood.

Loosely mounted on the shaft 109 is a second stop arm 149, Figs. 8 and 9, which may be similarly constructed to the stop arm 142 and carry the yielding block 150 with an appropriate shoulder 151 to contact with the stop lug 144 on the clutch member 145, a spring 152 normally acting to hold the stop arm 149 in depressed position, as indicated in Fig. 8.

The shaft 94 carries an eccentric 153, Figs. 8 and 9, surrounded by an appropriate eccentric strap carrying an arm 154 provided at its lower extremity with a hooked end 155 adapted to engage with a roll 156 projecting from the stop arm 149, the arm 154 being held in normal engaging position by means of a spring 157, Figs. 8 and 9, the construction being such that under normal conditions, as indicated in Fig. 8, the stop arm 149 by virtue of the position of the eccentric 153 will be in lowered position, and the stop lug 144 will rest upon the shoulder of the block 143.

Upon depression of the treadle rod 13 and consequently the withdrawal of the stop arm 142 from engagement with the stop lug 144, the clutch member 145 will be freed to move into operative relation with its companion member and rotate the shaft 94. As the shaft 94 rotates from the position indicated in Fig. 8 to that indicated in Fig. 9, the eccentric 153 will lift the arm 154 and move the stop arm 149 to position the shoulder 151 of the block 150 for contact with the stop lug 144 of the clutch member, and thereby disengage the clutch from operative engagement with the shaft 94 upon a substantially one-quarter rotation of said shaft. Such rotation of the shaft 94 acting through the eccentric 128 and cam 112, Figs. 3 and 4, will move the jaw carrier 101 into position, as indicated in Figs. 3 and 7, with the jaw 113 in the path of movement of the line of tacks securing the upper to the insole. So long as the parts remain undisturbed in this position by the absence of tacks in the shoe, the tack puller remains in its normal or tack engaging relation, as indicated in Figs. 3 and 7. As the shoe continues to be fed step by step by the spudger, as hereinbefore described, and the tack meets the foot portion 114 of the jaw 113 the positive feed of the shoe will cause the tack to swing the jaw 113 clockwise, as indicated in Fig. 7, thereby moving the arm 115 and perforce the bell crank 118 which, acting through its connected parts, will move the trip arm 126 into contact with the arm 154, Figs. 8 and 9, disengaging the hooked end portion of the arm 154 from the roll 156 of the stop arm 149, thereby withdrawing said stop arm from operative engagement with the stop lug 144 of the clutch member 145 and permitting the shaft 94 to be rotated, as will be readily understood. As the shaft 94 thus rotates, the cam 112, Figs. 3 and 4, will act upon the roll 111 of the arm 110, and move the lever 108 to cause the jaws to close upon the tack, and, as the jaws can move no farther, further action of the lever 108 will tend to turn the jaw carrier 100 about a fulcrum 99 as a center, thereby lifting the jaws in their closed position upward from the shoe to withdraw the tack. As the shaft 94 continues its rotative movement the jaw carrier will be moved by the eccentric arm 130 rearwardly substantially in a path as indicated by dotted lines in Fig. 3, until a low portion of the cam 112 comes opposite the roll 111, whereupon the spring 158, Fig. 3, will move the lever 108 and cause the jaws to be opened and drop the tack. In order to prevent the jaw carrier 100 from tilting during this opening movement of the jaws to release the tack, said jaw carrier is provided with a tail-piece 159, Figs. 3 and 4, which bears against a pin 160 carried by the cam 112, so that on the upward movement of the end 107 of the arm 108, the jaw carrier will be held in fixed position while the jaws open and release the tack. A spring 161, Figs. 3 and 4, acts normally on the end of the tail-piece 159 to hold the rear end of the jaw carrier 100 elevated.

From the construction described it will be apparent that the tack puller, during the action of the machine, normally stands in the position indicated in Fig. 7 with the foot portion 114 of one of the jaws in the path followed by the tacks as the shoe is fed positively in the direction of feed by the spudger, and, upon contact of a tack with the jaw, the tack puller is given its initiating movement through the means described to close the jaws upon the tack, raise the jaws and pull the tack, and then move the jaws rearwardly into an upward and rear position, where the jaws are opened to release the tack. As the shaft 94 continues in the completion of its single rotative movement responsive to the action hereinbefore described, the eccentric 153 raises the arm 154, the lower end of which is in engagement at this time with the roll 156 of the stop arm 149 and thereby places the shoulder 151 in the path of the stop lug 144 on the clutch member 145, the construction being such that as the shaft completes its movement the clutch member 145 is stopped, disengaging the driving power from the shaft 94, and the tack puller, with its jaws still open, is moved downward and forward into position as indicated in Fig. 7.

The characteristic movement of the tack puller is approximately indicated by the diagrammatic view in Fig. 12, wherein at the point *a* the jaws are in position, as indicated in Fig. 7, ready to be engaged by and close upon a tack; and as the jaws rise in response to the action hereinbefore described, they follow the path indicated by the arrows, in Fig. 12, to a point *b* in pulling the tack, and at the point *c* the jaws open to release the tack, after which, the jaws still being open, they move in the direction of the arrow back to the point *a*.

The action thus far described contemplates that the foot of the operator remains on the treadle, but, should the operator take his foot from the treadle, the stop arm 142 will move to the left, from the position indicated in Fig. 9 to that indicated in Fig. 8, a plunger 162 at such time striking a finger 163 connected to the arm 154, thereby disengaging the hooked end 155 of said arm from the roll 156 of the stop arm 149 and permitting said stop arm to move into position indicated in Fig. 8, so that as the shaft 94 rotates, as hereinbefore described, the stop lug 144 engages the shoulder of the stop arm 142 and brings the machine to rest with the tack puller in its upward retracted position, substantially as indicated at the point *b*, Fig. 12, and as indicated also in Fig. 4.

In order that the tacks may be appropriately discharged from the machine without interference with its working parts, the back gage 83 and its carrier 82 are provided with an opening 164, Figs. 1, 3 and 4, into which the tacks may drop and from which they may be discharged by a suitable conduit or other connection.

Since the tack pulling end of the tack puller moves in the path indicated by dotted lines in Fig. 3, the end 116 of the arm 115 will follow a like course, and in order that it may be returned to its initial position opposite the end of the arm 117 when the tack puller returns to its initial position, as indicated in Fig. 7, there is provided a returning finger 165 secured to the fulcrum stud 119 on which the bell crank lever 118 is fulcrumed, the end of said returning finger being projected, as indicated in Fig. 11, to properly position the end of the arm 115 on the return movement of the tack puller to initial position.

From the construction described it will be noted that each of the series of stitches contemplated by the present invention is preferably formed after each double feed movement and that the channel of the insole is tempered or moistened by the moistening liquid flowing from the tank through its conduit to the channel guide, and the lasting tacks are removed so that the shoe is not only free from the objectionable presence of these obstructions to the action of the welter, but the channel of the insole itself is properly tempered or moistened to facilitate the passage of the needle during the stitching of the welt to the upper and insole.

Obviously many changes may be made in the details of construction without departing from the true spirit of the present invention which is definitely set forth by the claims.

What is claimed is:

1. In a shoe sewing machine, the combination of stitch forming mechanism, a tack puller, and means for actuating the tack puller to pull a tack, said means being rendered effective to initiate the tack pulling operation by movement of a tack in the direction of feed.

2. In a shoe sewing machine, the combination of stitch forming means, a tack puller associated therewith, devices for moving the tack puller to pull a tack, and means actuated by contact of a tack with the tack puller to initiate the tack pulling movement.

3. In a shoe sewing machine, the combination of stitch forming means, a tack puller, devices for operating the tack puller to pull a tack, means for imparting a feed movement to the work between each stitch formation, and means actuated by contact of a tack with the tack puller as the shoe is fed by the feeding means to initiate tack pulling movement.

4. In a shoe sewing machine, the combination of stitch forming means, feeding means for the work, a tack puller, means for giving the tack puller its tack pulling movement, and devices for rendering said means operative when a tack meets and moves the tack puller as the shoe is moved by the feeding means.

5. In a shoe sewing machine, the combination of stitch forming mechanism, a tack puller comprising a pair of jaws, operating devices for moving the tack puller to pull a tack and means actuated by contact of a tack with the tack puller to initiate the tack pulling movement.

6. In a shoe sewing machine, the combination of stitch forming mechanism, a tack puller comprising a pair of jaws, operating devices for moving the tack puller to pull a tack, means for positively feeding the work past the tack puller, and means actuated by contact of the tack with one of the jaws of the tack puller to cause said operating devices become operative.

7. In a shoe sewing machine, the combination of stitch forming means, a tack puller comprising a pair of jaws, operating means to cause said jaws to close upon the tack and pull it from the work, and mechanism actuated by contact of a tack with one of said jaws to start said operating means.

8. In a shoe sewing machine, the combination of stitch forming means, a tack puller comprising a pair of jaws, means to cause said jaws to close upon the tack, withdraw said tack from the work, and to drop said tack, and devices for rendering said means operative when a tack meets one of said jaws.

9. In a shoe sewing machine, the combination of stitch forming means, a tack puller comprising a pair of jaws, means to cause said jaws to close upon the tack, withdraw said tack from the work, drop said tack, and then return the jaws to initial position, and devices actuated by contact of a tack with one of said jaws to render said means operative.

10. In a shoe sewing machine, the combination of stitch forming means, a tack puller comprising a pair of jaws, one of which is normally positioned in the path of movement of the lasting tacks during the operation of the machine, means to cause the jaws to close upon the tack and pull the same from the work, and mechanism actuated upon movement of one of said jaws to render said means operative.

11. In a shoe sewing machine, the combination of stitch forming mechanism, means for positively feeding the work, a tack puller, means connected to and to actuate said tack puller to pull a tack, and mechanism for rendering said means effective when the tack puller is moved by a tack as the shoe is fed.

12. In a shoe sewing machine, the combination of stitch forming means, a back gage, a tack puller, actuating means to cause the tack puller to pull a tack, and mechanism to render said means operative when a tack is presented to the tack puller.

13. In a shoe sewing machine, the combination of stitch forming mechanism, a back gage having an opening for the passage of tacks, a tack puller, and means for causing said tack puller to pull a tack and drop it into the opening of the back gage.

14. In a shoe sewing machine, the combination of stitch forming mechanism, a back gage having an opening for the reception of tacks, a tack puller comprising a pair of jaws, and means for causing said jaws to close upon and withdraw a tack from the work and open said jaws to drop a tack into the opening of the back gage.

15. In a shoe sewing machine, the combination of stitch forming mechanism, a tack puller, means for moving the tack puller into the path of the lasting tacks as the machine is started and for normally maintaining it in such position during the sewing operation, and actuating devices for operating the tack puller when a tack is presented thereto.

16. In a machine for preparing a shoe for the welting operation, the combination of stitch forming mechanism for producing basting stitches in holding the upper to the insole, means in advance of the stitch forming mechanism for pulling tacks, and channel moistening means for tempering the channel of the insole, said devices coacting to prepare the shoe and leather for the attachment of the welt.

17. In a shoe sewing machine, the combination of stitch forming mechanism, a tack puller, means for moving the tack puller into the path of the lasting tacks as the machine is started, and actuating devices for operating the tack puller only when a tack is presented thereto, said devices acting to return the tack puller into the path of movement of the lasting tacks after a tack pulling movement.

18. In a shoe sewing machine, the combination of stitch forming mechanism, a tack puller comprising a pair of jaws, a jaw carrier, means to cause said jaws to close upon the tack, and thereafter move the jaw carrier to withdraw the tack from the work, and mechanism actuated by contact of a tack with one of said jaws to render said means operative.

19. In a shoe sewing machine, the combination of stitch forming mechanism and a tack puller, means for starting the machine into operation and for positioning the tack puller in the line of movement of the tacks as the shoe is fed, and means to cause the tack puller to pull a tack.

20. In a welt shoe preparing machine, the combination of stitch forming mechanism, a tack puller comprising a pair of jaws, a jaw carrier, and means made effective by contact of a tack with one of said jaws to cause the jaws to close upon the tack and the carrier to be moved to pull the tack and thereafter to open the jaws and release the tack.

21. In a shoe sewing machine, the combination of stitch forming mechanism, a tack puller comprising a movable and a relatively fixed jaw, one of said jaws having a portion extending into the path of the lasting tacks as the work is fed to the stitch forming mechanism, and means actuated by contact of a tack with said jaw for causing the jaws to close upon the tack to pull the same from the work.

22. In a shoe sewing machine, the combination of stitch forming mechanism and a tack puller, means for starting the machine into operation, and positioning the tack puller in operative position with respect to the work, and means for withdrawing the tack puller from operative position when the machine is stopped.

23. In a welt shoe preparing machine, for basting the upper in position prior to attaching the welt, the combination of stitch forming mechanism, a tack puller, a carrier for said tack puller, means for maintaining the tack puller in the path of movement of the lasting tacks during the sewing operation, and means operating to move the tack puller upward and backward to pull and remove a tack when such tack is presented to the tack puller.

24. In a welt shoe preparing machine for basting the upper in position prior to attaching the welt, the combination of stitch forming mechanism, a tack puller disposed in advance of the stitch forming mechanism, a tack pulling shaft, and connections between the tack pulling shaft and tack puller to operate the latter when the tack puller is moved by a tack.

25. In a welt shoe preparing machine for basting the upper in position prior to attaching the welt, the combination of stitch forming mechanism, means for feeding a shoe to said mechanism, a tack puller having a pair of jaws, means for maintaining said jaws in separated relation with one of said jaws in the path of the lasting tacks as the shoe is fed to the stitch forming mechanism, devices for closing the jaws upon a tack and imparting tack pulling movement, and mechanism controlled by one of said jaws to actuate said devices.

26. In a shoe sewing machine, the combination of stitch forming mechanism, a driving shaft for operating said mechanism, a tack puller disposed in advance of the stitch forming mechanism to pull the lasting tacks before they reach said mechanism, a tack pulling shaft, connections between said shaft and tack puller to operate the latter, and means for rendering said shaft operative to actuate the tack puller only when a tack is presented thereto.

27. In a shoe sewing machine, the combination of stitch forming mechanism, a driving shaft for operating said mechanism, a tack puller, comprising a pair of tack pulling jaws, disposed in advance of the stitch forming mechanism to pull the lasting tacks before they reach said mechanism, a tack pulling shaft, connections between said shaft and tack puller to operate the latter, and means for rendering said shaft operative to actuate the tack puller only when a tack is presented thereto.

28. In a machine of the character described, the combination of stitch forming mechanism, a driving shaft for operating the same, a clutch and its operating device for connecting the driving shaft to a source of power, a tack puller, a tack pulling shaft, connections between the tack pulling shaft and tack puller for operating the tack puller, and means operative as the clutch is moved into driving connection with the said driving shaft to move the tack puller into the line of movement of the tacks and maintain it in such position until met by a tack.

29. In a machine for basting the upper of a shoe in position with relation to the insole prior to attaching the welt, the combination of stitch forming mechanism, operating means therefor including a clutch, a tack puller to pull the lasting tacks before they reach the stitch forming mechanism, means for operating the clutch and causing the tack puller to move to and remain in position for engaging the lasting tacks, as the shoe moves past the tack puller, devices for operating the tack puller to pull a tack, and means for rendering said device operative when a tack meets the tack puller.

30. In a machine of the character described, the combination of stitch forming mechanism, a driving shaft for operating the same, a tack puller for pulling tacks from the shoe before they reach the stitch forming mechanism, means for moving the tack puller upward, backward, and to initial position in pulling a tack, and mechanism actuated when a tack meets and moves the tack puller to cause said means to operate.

31. In a welt shoe preparing machine, the combination of stitch forming mechanism, a tack puller disposed in advance of said mechanism to pull tacks from the shoe before they reach said stitch forming mechanism, said tack puller comprising a relatively fixed jaw and a movable jaw, said fixed jaw having a part extending into the path of movement of the lasting tacks during the sewing operation, and means to close said jaws and pull a tack when such tack meets the part extending from the relatively fixed jaw.

32. In a welt shoe preparing machine, the combination of stitch forming mechanism, a driving shaft for operating the same, a clutch for connecting the driving shaft to a source of power, a tack puller disposed in advance of the stitch forming mechanism to pull tacks before they reach said mechanism, a tack pulling shaft separate from the driving shaft, connections between the tack pulling shaft and tack puller to operate the latter, means for operating the clutch to start the machine and move the tack puller into tack pulling position, and means for operating the tack pulling shaft.

33. In a machine for preparing a shoe to receive the welt, the combination of stitch forming mechanism, a tack puller for pulling tacks from the shoe before they reach the said mechanism, said tack puller comprising a pair of jaws, means for operating said jaws to close upon and pull a tack from the shoe, a catch for normally holding said means inoperative with the jaws in the path of movement of the lasting tacks, and a trip for disengaging the catch and permitting the jaw operating means to operate.

34. In a machine for preparing a shoe to receive the welt, the combination of stitch forming mechanism, means for feeding a shoe to said stitch forming mechanism, a tack puller for pulling tacks from the shoe before they reach the said mechanism, said tack puller comprising a pair of jaws, means for operating said jaws to close upon and pull a tack from the shoe, a catch for normally holding said means inoperative with the jaws in the path of movement of the lasting tacks, and a trip for disengaging the catch and permitting the jaw operating means to operate.

35. In a welt shoe preparing machine, the combination of stitch forming mechanism, a pair of tack pulling jaws disposed in advance of said mechanism to pull tacks before they reach the stitch forming mechanism, one of said jaws having a part extending into the path of movement of the lasting tacks, a shaft carrying the other jaw, and means for operating said shaft to close the jaws upon a tack and pull the same.

36. In a welt shoe preparing machine, the combination of stitch forming mechanism, a pair of tack pulling jaws disposed in advance of said mechanism to pull tacks before they reach the stitch forming mechanism, one of said jaws having a part extending into the path of movement of the lasting tacks, a shaft carrying the other jaw, means for operating said shaft to close the jaws upon a tack and pull the same, and means for moving the jaws back to carry the tack away from the work.

37. In a welt shoe preparing machine, the combination of stitch forming mechanism for basting the upper of a shoe in position prior to attaching the welt, tack puller jaws disposed in advance of the stitch forming mechanism to pull tacks before they reach said mechanism, a jaw carrier, a support for said jaw carrier, means set in operation by a tack for closing the jaws on the tack and lifting said jaws to pull the tack, and means to move the jaw carrier backward from the work.

38. In a welt shoe preparing machine, the combination of stitch forming mechanism, a pair of tack pulling jaws disposed in advance of said mechanism to pull tacks before they reach the stitch forming mechanism, one of said jaws having a part extending into the path of movement of the lasting tacks, a shaft carrying the other jaw, means for operating said shaft to close the jaws upon a tack and pull the same, a catch normally maintaining said means inoperative, and a trip actuated by movement of one of said jaws when met by a tack to trip the catch and permit the said means to operate.

39. In a welt shoe preparing machine, the combination of stitch forming mechanism, a tack puller disposed in advance of said mechanism to pull the lasting tacks before they reach the stitch forming mechanism, means for actuating the tack puller, a catch normally locking said means in inoperative condition, and a trip for moving said catch and permitting said means to operate the tack puller.

40. In a machine of the character described, the combination of stitch forming mechanism, a tack puller, means acting during the normal operation of the machine to hold the tack puller in position to be met by the lasting tacks as the shoe is fed, and means rendered operative by a tack to impart tack pulling movement to the tack puller.

In testimony whereof, I have signed my name to this specification, in the presence of two subscribing witnesses.

THOMAS G. PLANT.

Witnesses:
   GRACE L. LANDERS,
   ALFRED H. HANDLEY.